US008666966B2

(12) United States Patent
Ranganathan et al.

(10) Patent No.: US 8,666,966 B2
(45) Date of Patent: Mar. 4, 2014

(54) PROVIDING PARALLEL RESULT STREAMS FOR DATABASE QUERIES

(75) Inventors: Venkatesan N. Ranganathan, San Jose, CA (US); Andrew D. Therber, Columbus, IN (US); Anoop Sharma, San Jose, CA (US); Hansjorg Zeller, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 12/362,702

(22) Filed: Jan. 30, 2009

(65) Prior Publication Data

US 2010/0198855 A1 Aug. 5, 2010

(51) Int. Cl.
*G06F 17/30* (2006.01)
(52) U.S. Cl.
USPC .......................................... 707/713; 707/764
(58) Field of Classification Search
USPC .................................. 707/718, 713, 714, 706
See application file for complete search history.

(56) References Cited

U.S. PATENT DOCUMENTS

| | | | |
|---|---|---|---|
| 6,341,302 B1 * | 1/2002 | Celis | 718/100 |
| 6,424,967 B1 * | 7/2002 | Johnson et al. | 1/1 |
| 6,601,062 B1 * | 7/2003 | Deshpande et al. | 1/1 |
| 6,728,694 B1 * | 4/2004 | Ramasamy et al. | 707/714 |
| 7,249,120 B2 * | 7/2007 | Bruno et al. | 1/1 |
| 7,552,113 B2 * | 6/2009 | Roe et al. | 1/1 |
| 7,574,424 B2 * | 8/2009 | Chowdhuri | 1/1 |
| 2003/0028509 A1 * | 2/2003 | Sah et al. | 707/1 |
| 2007/0174278 A1 * | 7/2007 | Ramesh et al. | 707/7 |
| 2007/0250470 A1 * | 10/2007 | Duffy et al. | 707/2 |
| 2008/0059407 A1 * | 3/2008 | Barsness et al. | 707/2 |
| 2008/0313149 A1 * | 12/2008 | Li et al. | 707/3 |
| 2009/0019028 A1 * | 1/2009 | Norris et al. | 707/5 |
| 2009/0077011 A1 * | 3/2009 | Natarajan et al. | 707/2 |
| 2009/0204593 A1 * | 8/2009 | Bigby et al. | 707/4 |
| 2009/0271385 A1 * | 10/2009 | Krishnamoorthy et al. | 707/4 |
| 2010/0082655 A1 * | 4/2010 | Silberstein et al. | 707/759 |
| 2011/0072008 A1 * | 3/2011 | Mandal et al. | 707/720 |

* cited by examiner

*Primary Examiner* — Hung T Vy

(57) ABSTRACT

A system and method for providing parallel result streams for database queries is provided. The system includes a network including a client, a server, and a database. The client executes an application and sends a query to the server. In response, the server compiles the query to produce a query plan, executes statements in the query plan and sends parallel result streams to the client.

15 Claims, 4 Drawing Sheets

PROVIDING PARALLEL RESULT STREAMS FOR DATABASE QUERIES

FIELD OF THE INVENTION

The present invention relates generally to databases, database queries, and more particularly to parallel extraction and parallel streams.

BACKGROUND

A data stream (a/k/a stream) may be defined as the communication of data over time. A result stream may be defined as a data stream resulting from a query within a database. Large databases, such as, for example, those used in data warehousing, may be partitioned using range partitioning, list partitioning, hash partitioning, or composite partitioning, for example. A database extract operation may, for example, extract information from a hash partitioned database.

Database extracts to satisfy a query are typically provided as a single stream for the whole query. A single stream for the whole query may severely limit performance of an extract operation and provide limited opportunities for network and throughput scaling. In addition, as a workaround, range queries (i.e., a query over a range of values) may be used to parallelize database extracts. Range queries may result in resource consumption that is a multiple of the number of parallel range queries issued, when the data is hash-partitioned and every disk hosting a partition for the table may have to do work to materialize data for the query regardless of the ranges in use.

BRIEF DESCRIPTION OF THE DRAWINGS

Embodiments according to the invention are illustrated by the following drawings.

DETAILED DESCRIPTION

Figure 1:
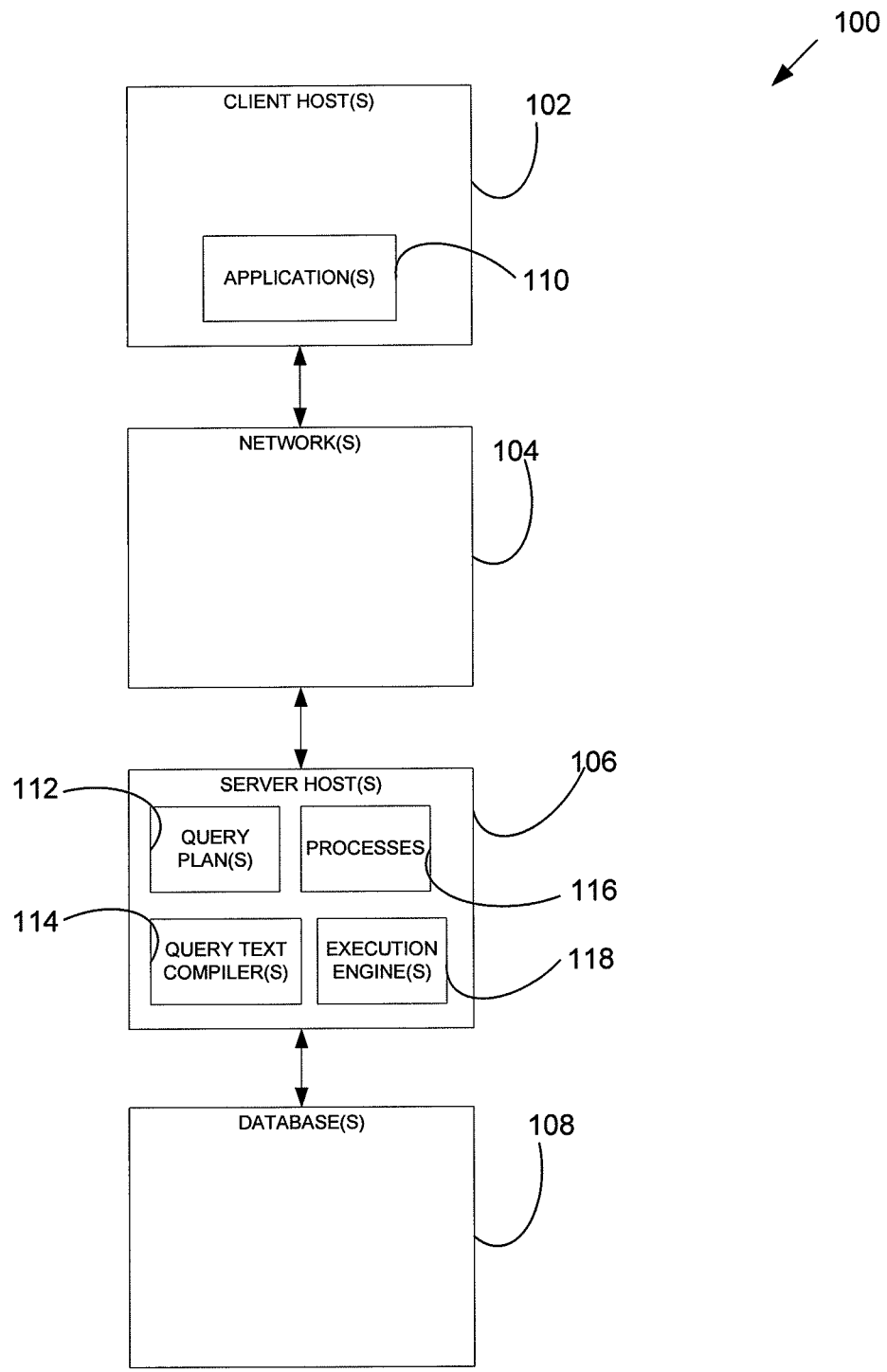
FIG. 1 is a block diagram illustrating an exemplary system for providing parallel result streams for database queries.

FIG. 1 illustrates an exemplary system 100 for providing parallel result streams for database queries. The exemplary system 100 may be a client-server system and may include various hardware, firmware, software, and/or other computing devices. One or more client hosts 102 may communicate over a network 104 to one or more server hosts 106, which may be coupled to one or more databases 108. The database 108 may be, for example, a hash-partitioned parallel database or some other kind of database. One or more applications 110, such as, for example, a load/extract application may run on the client host 102 and may send query text to the server host 106 over the network 104. The client host 102 and the server host 106 each may include a storage medium, a processor, and communication hardware and software. The server host 106 may include one or more query plans 112, a query text compiler 114, a number of executing processes 116, and one or more instances of an execution engine 118. For example, the query text sent from the client host 102 may be compiled by the compiler 114 and executed by processes 116 and/or instances of the execution engine 118. The results of the query may then be sent to the application 110 the client host 102.

Figure 2:
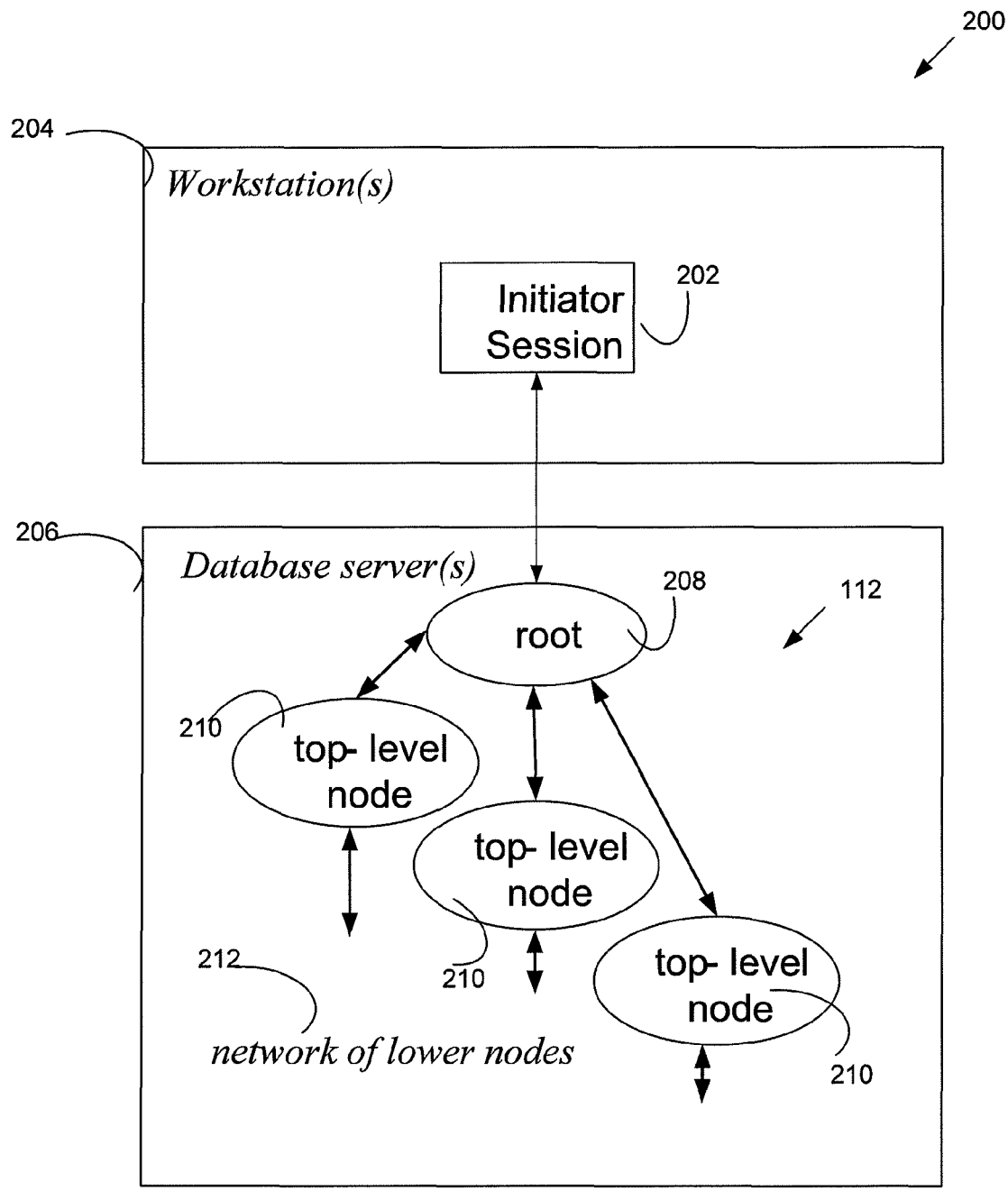
FIG. 2 is a block diagram illustrating an exemplary method and system for an initiator session in an application running on a workstation to send a query to a database server.
Figure 4A:
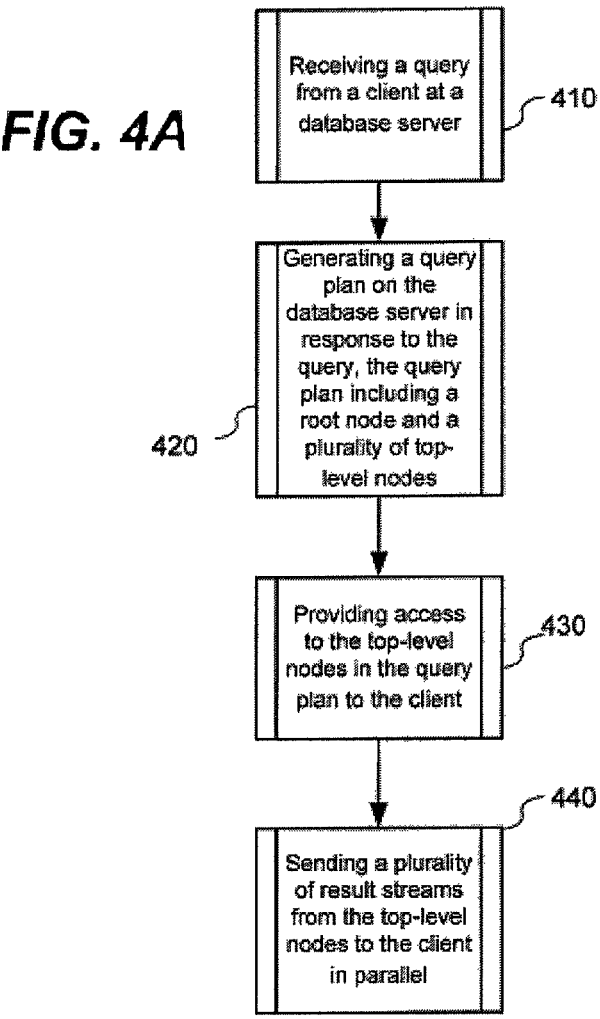
FIGS. 4A and 4B are flow diagrams illustrating exemplary methods according to exemplary embodiments of the invention

FIGS. 2 and 4A illustrate an exemplary system 200 and method. System 200 is one example of the system 100 of FIG. 1. In system 200, the client node 102 may be a workstation 204 including an initiator session 202. The initiator session 202 may send query text to the server host 106, which may be a database server 206 as shown in FIG. 2, step 410. The exemplary system 200 may perform one or more methods or database applications, such as, for example, online transaction processing (OLTP), query processing in data warehousing, or data movement.

The workstation 204, in a database environment, may include a load/extract application that may establish the initiator session 202 with the database server 206. The load/extract application may issue queries within the initiator session 206. When the load/extract application makes a request to query data from the database 108, a query plan 112 for servicing the query may be generated, step 420.

The query plan 112 may be a sequence of steps or operations that the database server 206 may perform to satisfy the query. The query plan 112 may be executed to generate the results, which may be presented to the application. The query plan 112 may be stored in a data structure, such as, for example, a tree with one root node 208, top-level nodes 210 and lower nodes 212 in the tree that represent the levels of processing steps or operations of the query. These intermediate processing nodes may involve joins, sorts, merges, disk access or other kinds of processing steps or operations. The non-root nodes 210, 212 in the query plan 112 may execute in different database server processes 116 and may, for example, be spread throughout a cluster, in a clustered database architecture.

The database server 206 may identify portions of the query plan that may be executed in parallel by, for example, accessing table partitions and intermediate sorts, and schedule them to run in parallel. The final results may be delivered to the root node 208, which is associated with the initiator session 202, steps 430, 440.

Figure 3:
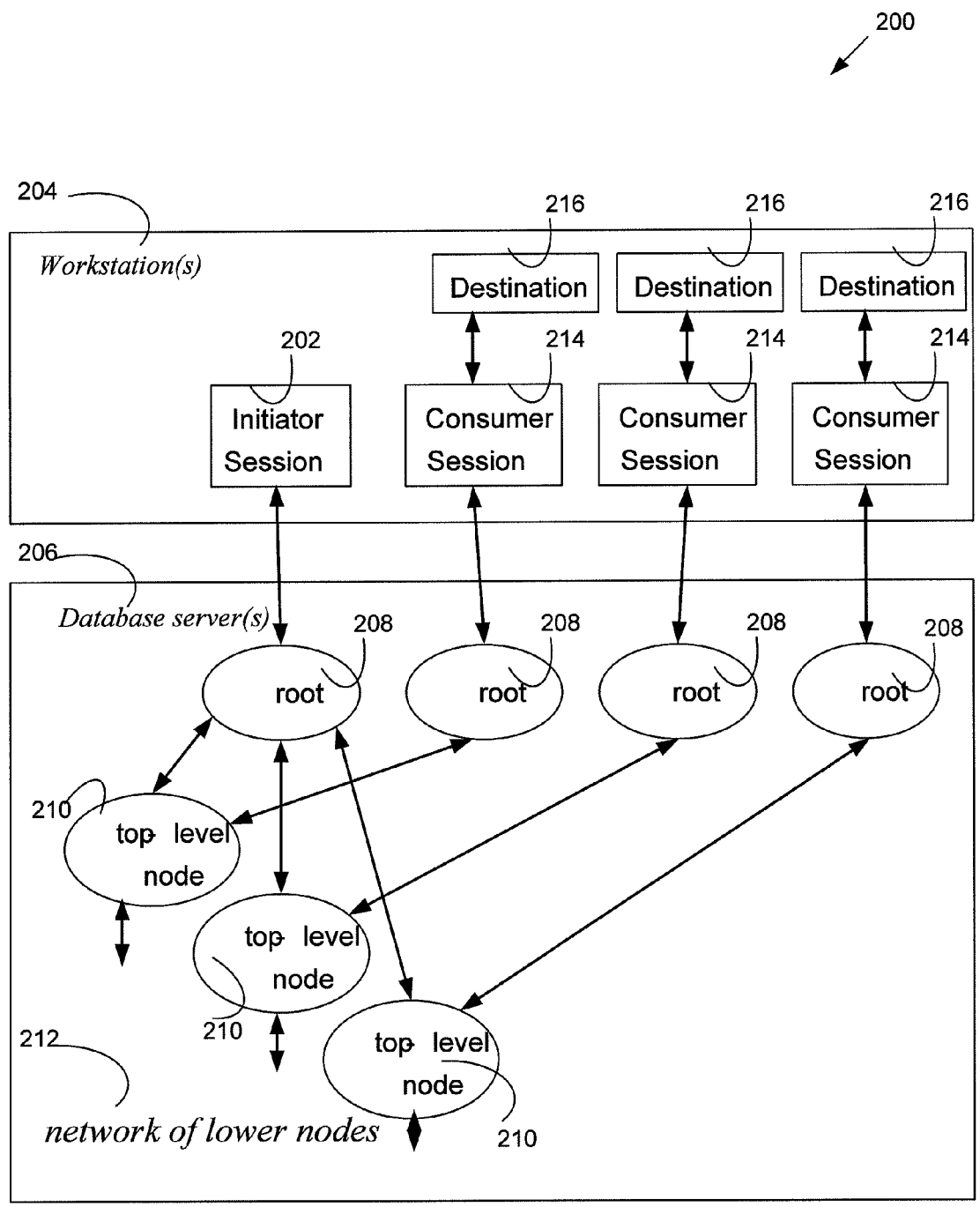
FIG. 3 is a block diagram illustrating an exemplary system for a number of consumer sessions to receive parallel result streams in response to the query requested in FIG. 2.
Figure 4B:
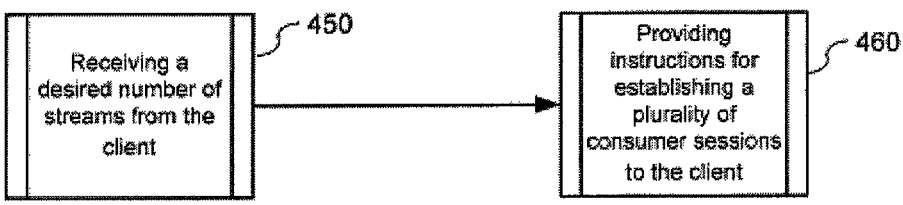

FIGS. 3 and 4B illustrate an exemplary method and system 200 for a number of consumer sessions 214 to receive parallel result streams in response to the query requested in FIG. 2. While the prior art delivered final query results in a serial manner, the exemplary system 200 may deliver query results in a parallel manner. This may facilitate faster data movement for some data warehouse applications, such as, for example, parallel extract transform load (ETL) jobs.

Using the initiator session 202, the application 110 may submit a query request, which may include a desired number of parallel result streams, to the database server 206. The workstation 204 and the database server 206 may communicate to create a number of consumer sessions 214 in the application 110 with access to parallel result streams from the top-level nodes 210, where the access may be through a number of root nodes 208.

The access to the parallel result streams may be provided with various security mechanisms. The initiator session 202 may send authentication information from the database server 206 to the consumer sessions 214 to be used to access the result streams. The consumer sessions 214 may share the transactional context of the initiator.

The system 200 may allow users to initiate, for example, a parallel extract operation by running a load/extract application running on the workstation 204. The input to the operation may be the text of a query, the requested number of result streams, and/or a destination 216 for each stream. Destinations 216 may include files, named pipes, processes, file transfer protocol (FTP) targets and other destinations. The parallel extract operation may divide the query result stream into a collection of smaller streams and move those streams in parallel to the destinations 216. The load/extract application may annotate structured query language (SQL) statements in the query text sent from the initiator session 202 to the database server 206 with a desired number of result streams, step 450.

In response to the query text, the database server 206 may create the query plan 112 so that the number of top-level nodes 210 is the same as the desired number of result streams. Each top-level node 210 may receive one result stream from lower nodes 212 throughout a network cluster for parallelism and load balancing benefits. The database server 206 may use knowledge of data placement and the cost of SQL operations to best determine the placement of the top-level nodes 210.

The initiator session 202 may send query text to the database server 206 and the database server 206 may initialize the query plan 112. After the database server 206 creates the query plan 112, the application 110 on the workstation 204 may run. The application 110 may be, for example, a load/extract application. The load/extract application may send a request for information about the top-level nodes 210 to the database serer 206. The database server 206 may respond with information (e.g., a collection of internally-generally SQL statements) that may be used by the application 110 to contact the top-level nodes 210. The application 110 may use this information to establish a number of consumer sessions 208 and may issue a consumer query (e.g., SQL statement) from each consumer session 208 to each top-level node 210. The consumer queries may execute in parallel (e.g., within different processes or threads) on the workstation 204, step 460.

Within the initiator session 202, the load/extract application may issue a request to the database server 206 to begin sending the parallel result streams. The database server 206 may respond with a status, such as, for example, successful delivery of the parallel result streams.

Within each consumer session 208, the database server 206 may process a consumer query by compiling it, modifying it and creating a partial query plan (not shown). The partial query plan may include knowledge of one of the top-level nodes 210. When the partial query plan is executed, this particular top-level node 210 may be contacted and instructed where to send its result stream (from the lower nodes 212 under that top-level node 210). Each result stream may flow out of a top-level node 210 and into a consumer session that is under control of the load/extract application. As result streams are delivered or communicated directly to the consumer sessions 214, the load/extract application may move data into the appropriate destinations 216. In general, the delivery of the parallel result streams may be implemented in various ways using a listener-handler (e.g., each top-level node as a listener and each consumer session as a handler) model. The parallel result streams may be delivered using SQL statements or in other ways.

Exemplary embodiments have many benefits, including providing parallel result streams from a query. In a data warehouse scenario, parallel result streams may be returned from operations such as ETL aggregation queries and data movement queries, resulting in faster extracts and loads.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for receiving parallel result streams for database queries, comprising:
    establishing, within a client, an initiator session with a database server;
    sending a query from the initiator session to the database server;
    receiving, at the initiator session, access to a plurality of top-level nodes in a query plan stored on the database server, wherein the query plan includes knowledge of data placement and cost of Structured Query Language operations of a top-level node for determining a placement of the top-level node in the query plan;
    establishing a plurality of consumer sessions with the database server, wherein the consumer sessions are within the client;
    receiving, at the consumer sessions, a plurality of parallel result streams from the top-level nodes, the parallel result streams including query results for the query; and
    sending the query results to a plurality of destinations from the consumer sessions.

2. The method of claim 1, wherein the query includes a desired number of streams, and the number of consumer sessions and the number of top-level nodes is equal to the desired number of streams.

3. The method of claim 1, further comprising:
    receiving, at the initiator session, instructions for establishing the consumer sessions from the database server.

4. The method of claim 1, wherein the plurality of consumer sessions is established by an application that issues a consumer query from a consumer session to a top-level node based on the knowledge of a top-level node.

5. A method for providing parallel result streams for database queries, comprising:
    receiving a query from a client at a database server;
    generating a query plan on the database server in response to the query, the query plan including a root node and a plurality of top-level nodes, wherein a placement of the plurality of top-level nodes in the query plan is based on knowledge of data placement and cost of Structured Query Language operations of the top-level nodes;
    providing parallel access to the top-level nodes in the query plan to a plurality of consumer sessions within the client; and
    sending a plurality of result streams from the top-level nodes to the plurality of consumer sessions within the client in parallel.

6. The method of claim 5, further comprising:
    receiving a desired number of streams from the client;
    providing instructions for establishing a plurality of consumer sessions to the client;
    wherein the number of consumer sessions and the number of top-level nodes is equal to the desired number of streams.

7. The method of claim 5, wherein a top-level node is contacted and instructed which consumer session is to receive the result stream of the top-level node.

8. A system for providing parallel result streams for database queries, comprising:
    at least one client executing at least one load/extract application, the client including a client processor for executing the application and a client storage device for storing instructions for the application, wherein the application establishes a number of consumer sessions with top-level nodes based on knowledge of data placement and cost of Structured Query Language operations of the top-level nodes received from a database;

a server in communication with the client over a network, the server including at least one storage device for storing at least one query plan and a processor for executing a plurality of statements in the query plan; and the database in communication with the server;

wherein the client is configured to send a query to the server and, in response, the server is configured to compile the query to produce the query plan, to execute the statements in the query plan and to send a plurality of parallel result streams to a plurality of consumer sessions within the client.

9. The system of claim 8, further comprising:
an initiator session on the client for sending the query to the server; and
a plurality of consumer sessions on the client for receiving the parallel result streams from the server.

10. The system of claim 9, further comprising:
a plurality of destinations for receiving a plurality of query results included in the parallel result streams.

11. The system of claim 9, wherein the query plan comprises a root node, a plurality of top-level nodes, and a plurality of lower nodes.

12. The system of claim 11, wherein the consumer sessions receive the parallel results streams from the top-level nodes.

13. The system of claim 11, wherein the initiator session sends the query to the root node.

14. The system of claim 8, wherein the database is a hash-partitioned parallel database.

15. The system of claim 8, wherein the storage stores instructions for a plurality of processes, a query compiler, and at least one execution engine and the processor executes the processes, the query compiler, and the execution engine, the execution engine for executing a plurality of statements in the query plan.

* * * * *